7524X
J. ELGAR.
REVOLVING PLATFORM FOR RAILROADS.
Patented Apr. 12, 1833.
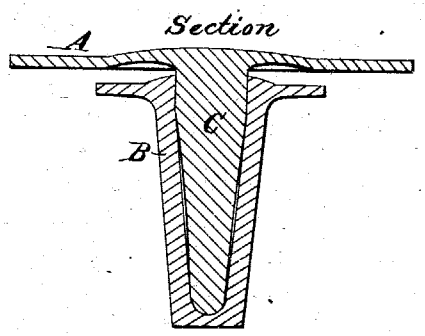
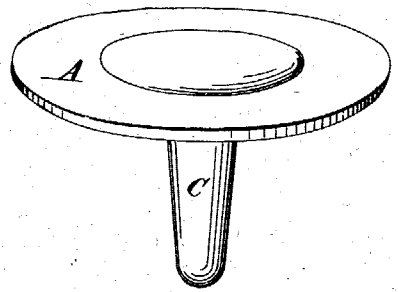
A. Platform.
B. Socket.
C. Spindle.
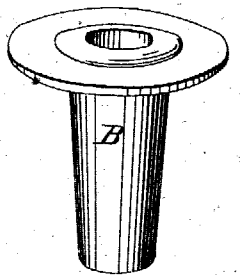

7524X  Apl 12. 1833  371.

John Elgar.

The schedule referred to in these Letters Patent, and making part of the
same, containing a description in the words of the said John Elgar himself of his
improvement in the mode of constructing the revolving platform employed upon
Rail Roads.

---

To all whom it may concern.

Be it known that I John Elgar, civil Engineer of the City of Philadelphia, in the
State of Pennsylvania, have invented, certain improvements in the mode of con-
-structing the revolving platform, employed upon Rail Roads, for the purpose
of turning rail way carriages, and that the following is a full, and exact descrip-
-tion thereof. —— I usually make the revolving platform, and the socket, with-
in which the projecting spindle which sustains it, turns, of cast iron, as being the
most suitable material. The upper side of the Platform, I in preference make
convex over a considerable part of its diameter, say to the distance of thirty inches
from the centre, giving to it a rise of two or three inches: from this rise to the periph-
-ery which constitutes the part upon which the wheels are to roll, and to rest, it
is made flat or has but a very slight inclination towards the outer edge. When the
car passes upon this, the advance wheels rise over a portion of the convex part,
and having passed this, the tendency of the car is to remain in its place while
the platform is turned. — Although I think the convex form of the upper side of
the platform the best, it is by no means an essential point, and it may be made
flat if preferred. — There are no rails, or grooves, upon the surface, of the Plat-
-form, as it is not intended that the wheels, shall be sustained by their tread, but
by the edges of their flanches, whilst upon it. — The Platform is consequently plane
sufficiently low, thus to receive the wheels, and is always in the right position
for that purpose, whether intended to pass on, or be turned round. — The under
side of the platform I generally make concave, so that the water which may run
from its slope, will not have any tendency to pass along it, towards the spindle upon
which it turns, or this may be prevented by the well known mode of forming a
ring, 772.  75244 ring, or fillet on the under side at its periphery which descends below the general
surface, which at the same time serves to strengthen the platform. — From the centre
of the platform, a spindle descends into a socket prepared to receive it. I usually make
this spindle about 20 inches long, about 8 inches diameter at top, where it joins the plat-
-form and tapering down to about three inches, at the bottom, where it tenons in the sock-
-et, upon a hemispherical end. — These dimensions, however, may be varied, according
to circumstances. — The socket in which the spindle turns, and which is its only sup-
-port, has a collar surrounding the cavity at its upper end, which embraces the spin-
-dle; the socket rises into the concavity of the platform, when it is made concave, and
approaches near to, but does not touch its under surface. — A projecting flanch, —
surrounds its upper end, which aids in sustaining it firmly in the frame work
or masonry, in which it is fixed —. When in its place, neither water, or dirt can
find its way into the socket, to mix with the oil, or obstruct the action of the ma-
-chine — ——— What I claim as my invention, and for which I ask a Patent.
is the construction of a revolving Platform, for rail roads, upon the principle
hereinbefore described — that is, to obtain the revolving motion, by means of a
spindle, and socket, without friction wheels, or rollers, beneath it; and the dispensing
with rails, and grooves, to guide the car — whether the same be constructed, in the exact
way specified, or in any other producing a like effect; and acting on the same principle.

Exd. Witnesses
WGo. Robt. Clark
Wm. Wallis

John Elgar

Patented April 12th 183[illegible]
([illegible])

(694 words)